J. S. WRIGHT & I. BENEDICT.
Potato-Diggers.
No. 135,458. Patented Feb. 4, 1873.
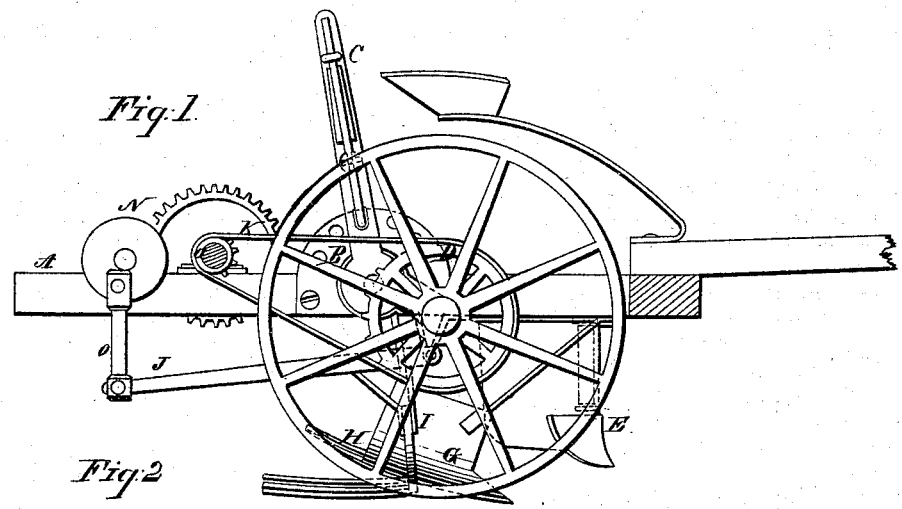
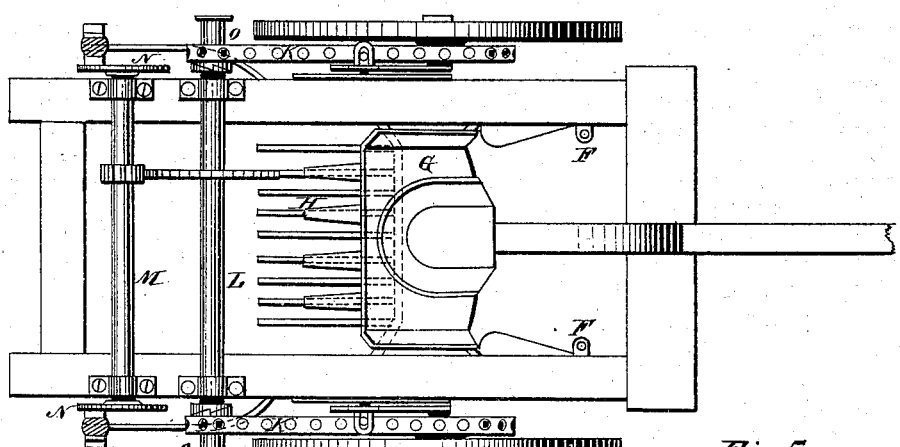
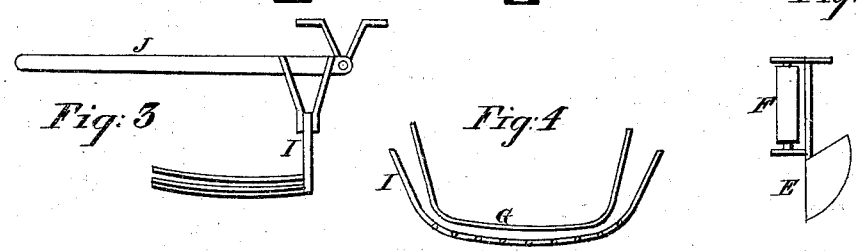
Witnesses:
Frank M. Wright
Charles Ketchum
Inventor:
John S. Wright
Ira Benedict

UNITED STATES PATENT OFFICE.

JOHN S. WRIGHT AND IRA BENEDICT, OF PALMYRA, NEW YORK.

IMPROVEMENT IN POTATO-DIGGERS.

Specification forming part of Letters Patent No. 135,458, dated February 4, 1873.

*To all whom it may concern:*

Be it known that we, JOHN S. WRIGHT and IRA BENEDICT, of Palmyra, in the county of Wayne and State of New York, have invented certain Improvements in a Machine for Digging Potatoes, of which the following is a specification:

The first part of our invention relates to constructing a wooden frame-work in such manner that the supporting-wheels and the means used for raising and lowering them may be applied to the outsides of the frame and the wheels and shafting necessary to actuate the agitator at the rear end. The second part relates to attaching two plows—one to turn the furrow to the right, the other to the left—to the under side and forward end of the frame, with vertical rollers to each to prevent the vines or weeds from clogging the plows and scoop, and attaching a scoop to the frame behind the plows, so that it will properly raise the potatoes out of the ground. The third part relates to arranging an agitator to shake the dirt from the potatoes so as to leave the potatoes uncovered by means of the peculiar motion given to the agitator made by the peculiar method of constructing the support and manner of attaching and supporting it.

Figure 1 is a side elevation, Fig. 2 a top view. Fig. 3 is a side view of the agitator. Fig. 4 is a rear view of the agitator and scoop. Fig 5 is a front view of one of the plows.

A is the frame-work of the machine. It is made in the form of a parallelogram with a neap bolted to the forward end so that two horses may be hitched to the machine. The frame may be made any size required. B is a semicircular plate with a series of holes through it near the periphery. There is one plate to each side of the frame. They are securely bolted to the frame, and are provided with a pin or bolt in the center to hold the lever C to it, so that the lever may be moved and held in any position. C is one of a pair of levers— one for each side of the machine. Their shape and position is shown in Fig. 1. They are bolted to the plate C and are provided with a spring-catch that will enter the series of holes in the plates for the purpose of holding the levers in any required position, the lower end of each lever extending in an angular direction, to which the axle for the supporting-wheels are fixed, these levers being used to raise and lower the frame to regulate the depth the scoop is required to work, and to raise the frame so that the wheels will support the digging apparatus above the ground for transportation. The supporting-wheels are of ordinary construction. Each lever works independent of the other, so that either side may be raised or lowered more than the other, when occasion requires it. D is one of a pair of sprocket-wheels, one for each side of the machine. They may be fastened to the supporting-wheels in any convenient manner so that the supporting-wheels will give them motion. Their use is to actuate the agitating apparatus. E is a plow. There is one at each side and forward of the scoop. Their use is to move away some of the dirt from the row of potatoes to relieve the scoop from much dirt that would otherwise pass over it. They are bolted to the under side of the frame, and their position is shown in Fig. 1. They each have a land-side portion, made to extend backward far enough to properly conduct the dirt and potatoes into the scoop. F is a vertical roller. There is one attached to the standard of each plow, as shown in Fig. 5. Their use is to prevent vines or weeds clogging the plows. G is the scoop. It may be made of cast or sheet metal with the forward edge made sharp, so that it will easily enter the ground, and with its sides turned upward, and the whole so shaped that it will go under the potatoes and raise them, so that as it is moved along the dirt and potatoes will fall upon the agitator to separate the potatoes from the dirt. The scoop is held in position by bracing-rods attached to the front and rear of each part that is turned upward, and these rods are securely bolted to the frame A. H is a series of prongs or fingers attached to the rear edge of the scoop. Their position is shown in Figs. 1 and 2 of the drawing. Their use is to prevent the dirt and potatoes from falling undisturbed on the agitator, and thus relieve it from much weight and allowing it to act with less resistance in performing its functions, four or five fingers or prongs being sufficient in a machine. I is the agitator. It is made of wrought-iron, bent in shape to correspond with the shape of the rear edge of the scoop, with each end branched so as to be securely fastened to the levers J that support and actuate it. All that portion of it underneath the scoop is provided with a series of tines that may be made any length required and distance apart. They may all be put through the iron and riveted to hold them securely or otherwise fastened to constitute the agitator. Their position is shown in Figs. 2 and 3 of the drawing. J is an arm or lever. There is one at each side of the machine, and they both are used for the same purpose, and are actuated by the same means. Their forward end is pivoted to a support that is bolted to the under side of the frame A. The hind end is held by a connection, as shown in Fig. 1. Their shape is shown in Fig. 3 and 4, between the two points of support and near the forward end, as shown in Figs. 1 and 3. The branches of the ends of the agitator I are securely fastened, so that when the hind end of the lever is raised and lowered by the connection O a swinging and alternate rising-and-falling motion is given to the agitator I and the tines combined with it to cause a perfect separation of the potatoes from the soil. K and K are belts or chains, made with open links to pass over the projections on the wheels and pinions. Their use is to impart motion to the transverse shaft L, and by their weight they will compensate for the change of position of the driving-wheels that is necessary in regulating the machine to the depth required. L is a shaft laid across the machine, as shown in Fig. 2. It is supported in journal-boxes on the top of the frame. On it and inside the frame is a spur-wheel that drives the pinion on the shaft M. At each end and outside of the frame A is a spur-pinion for the chains K. These pinions are made to turn freely on the shaft, and each pinion is provided with a clutch or ratchet and a coiled spring that will prevent the pinions being turned only one way, so that when the machine is being turned around one pinion will turn backward when the supporting-wheel is turned backward, and both will turn backward when the machine is moved backward. M is another shaft placed across the hind end of the frame A, as shown in Fig. 2. It is held in journal-boxes on the top of the frame, and has a spur-pinion fastened to it, by which it is turned. N and N are crank-wheels, fastened to the ends of the shaft M; they each have a crank-pin put in their outward face to attach the connections O between these wheels and the levers J. O and O are connections; they are shown in Figs. 1 and 2.

We claim as our invention—

1. The rollers F, when combined with the standards of the plows of a potato-digger, substantially as and for the purpose set forth.

2. The agitator I, in combination with the lever J, connecting-rod O, and crank-wheel N, as and for the purpose set forth.

JOHN S. WRIGHT.
      IRA BENEDICT.

Witnesses:
 FRANK M. WRIGHT,
 CHARLES KETCHUM.